(12) United States Patent
Muth

(10) Patent No.: US 6,978,362 B2
(45) Date of Patent: Dec. 20, 2005

(54) RESET ARRANGEMENT FOR A MICROCONTROLLER

(75) Inventor: Matthias Muth, Stelle (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 554 days.

(21) Appl. No.: 10/135,351

(22) Filed: Apr. 30, 2002

(65) Prior Publication Data

US 2002/0166044 A1    Nov. 7, 2002

(30) Foreign Application Priority Data

May 5, 2001    (DE) ............... 101 21 935

(51) Int. Cl.[7] ............ G06F 9/00; G06F 9/445
(52) U.S. Cl. .................... 713/1; 713/2
(58) Field of Search ................... 713/1, 2

(56) References Cited

U.S. PATENT DOCUMENTS 5,233,613 A * 8/1993 Allen et al. ............... 714/55
5,463,336 A * 10/1995 Gupta et al. .............. 327/143
5,513,319 A * 4/1996 Finch et al. ............... 714/55
5,528,749 A * 6/1996 Landis et al. ............. 714/23

* cited by examiner

Primary Examiner—Lynne H. Browne
Assistant Examiner—Stefan Stoynov
(74) Attorney, Agent, or Firm—Aaron Waxler

(57) ABSTRACT

A reset arrangement for a microcontroller and/or further hardware circuits to be reset should be optimally adaptable to the requirements of the microcontroller and/or the hardware circuits. To this end, the reset arrangement is formed in such a way that it is capable of applying a reset signal to the microcontroller via a reset line, supplies a first reset signal upon a system cold start of the reset arrangement and the microcontroller, the duration of this first reset signal being chosen to be such that any provided type of microcontroller starts reliably, is programmed with a second reset signal after a system cold start of the microcontroller, the duration of this second reset signal being adapted to the requirements of the microcontroller, and supplies the second, programmed reset signal as a reset signal at subsequent cold or hot starts.

8 Claims, 1 Drawing Sheet

RESET ARRANGEMENT FOR A MICROCONTROLLER

Figure 1:
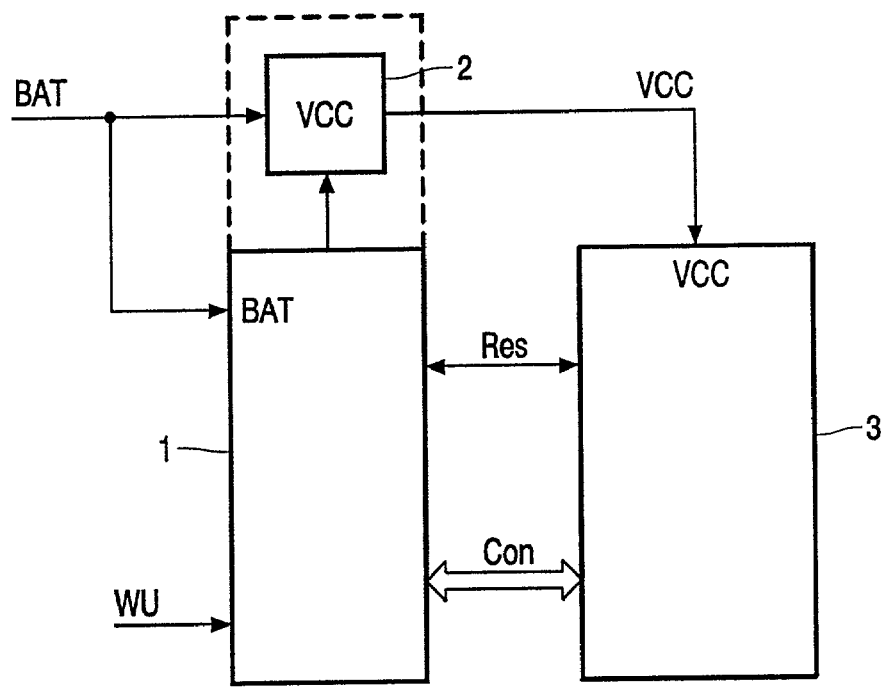

The invention relates to a reset arrangement for a microcontroller and/or one or more hardware circuits. The object of such a reset arrangement is to reset the microcontroller and/or the hardware circuits after a system cold start and/or after a cold or hot start.

A system cold start is concerned when the reset arrangement and the microcontroller are currentless and must be powered for the first time.

There is a cold start of the microcontroller when a power supply voltage is applied to the microcontroller which was already previously supplied with a current and reset by means of a system cold start, after it was initially without a power supply voltage. At such a cold start, a reset of the microcontroller is required due to the occurring, undefined states.

A hot start is concerned when the microcontroller has already been fed with a power supply voltage and the microcontroller is to be reset.

In the prior art, an extended reset of microcontrollers, required after a cold start can be achieved in that an external capacitance is arranged at the reset input of the microcontroller. This has, however, the drawback that the reset subsequently always has the length determined by the capacitance, even when this is not required, for example, in the case of a hot start.

In further known microcontrollers, which extend the reset themselves, there is the risk that the microcontroller is clamped in the state "reset active" when the oscillator associated with the microcontroller does not lock in. This produces an increased current consumption and the microcontroller is not ready for operation. Furthermore, a circuit is known from U.S. Pat. No. 5,463,336 in which two different reset lengths are used, a longer reset being triggered after the power supply voltage is switched on and a shorter reset being triggered upon a hot start. However, here again, fixed reset periods are impressed which are determined by the layout of the circuit and cannot be subsequently changed. Moreover, this system does not have any facility of controlling the result of a reset.

It is an object of the invention to provide a reset arrangement which, adapted to the microcontroller and further circuits, if any, allows possibly short resets.

According to the invention, this object is solved by the characteristic features defined in claim 1.

A reset arrangement for a microcontroller and/or one or more hardware circuits, wherein the reset arrangement
 is capable of applying a reset signal to the microcontroller via a reset line,
 supplies a first reset signal upon a system cold start of the reset arrangement and the microcontroller, the duration of this first reset signal being chosen to be such that any provided type of microcontroller starts reliably,
 is programmed with a second reset signal after a system cold start of the microcontroller, the duration of this second reset signal being adapted to the requirements of the microcontroller, and
 supplies the second, programmed reset signal as a reset signal at subsequent cold or hot starts.

After a system cold start, i.e. when the power supply voltage is switched on for the first time after a powerless state, the reset arrangement supplies a first reset signal. The duration of this first reset signal is chosen to be such that a microcontroller and/or other hardware circuits are reliably reset. The duration of this first reset signal may be adapted, for example, to different possible types of microcontrollers and different types of hardware circuits with which the reset arrangement can be combined. The duration of this first reset signal may also be chosen to be relatively long so as to comply with all possible requirements.

When the system cold start is successful, the reset arrangement is programmed with a second reset signal by means of the microcontroller, i.e. the reset arrangement receives a second reset signal whose duration is adapted to the requirements of the microcontroller and/or the hardware circuits which are also to be reset. This second reset signal can therefore be individually adapted to the microcontroller and the actual circuits and may therefore be shorter or even clearly shorter than the first reset signal.

When cold or hot starts are now performed after this successful system cold start and the programming of the reset arrangement with the second reset signal, the reset arrangement utilizes the second, programmed reset signal with the possibly shorter duration for these hot starts and the required reset procedures.

On the one hand, this has the advantage that a shorter reset procedure is possible for cold and hot starts as compared with system cold starts. The duration of this reset procedure is only as long as is required for the actually provided microcontroller and the possible hardware circuits to be reset. Moreover, since the length of the reset procedure performed upon a cold or a hot start is programmable, i.e. selectable, the reset arrangement may be used in the same construction for different types of microcontrollers and possibly different hardware circuits which are also to be reset, without the reset arrangement itself requiring any adaptation. The adaptation to these circuits is rather realized by the adapted length of the second programmed reset signal.

In an embodiment of the invention as defined in claim 2, the reset arrangement is provided on a system chip. With a view to an increasing system integration, analog circuit components and components for power supply required for use with a microcontroller are integrated in such a system chip. This provides the possibility of monitoring the microcontroller completely independently by means of such a system chip. For the reset arrangement according to the invention, the integration of this arrangement in such a system chip is advantageous because the system chip itself already initiates, for example, switching of the power supply voltage and the relevant information is provided anyway.

In an embodiment of the invention as defined in claim 3, the second programmed reset signal has a shorter duration than the first reset signal. As already mentioned above, this is generally the case and particularly advantageous because the cold or hot start can be chosen to be shorter in this way than the cold start. Nevertheless, due to the adapted duration of the second programmed reset signal, an optimized procedure takes place for the microcontroller and/or the hardware.

In accordance with further embodiments of the invention as defined in claims 4 and 5, safety mechanisms may be advantageously provided, which perform a reset with the first length of the reset signal when a reset with the length of the second reset signal fails. Under special circumstances, in which a reset with the second duration of the reset signal fails, a further reset with the mostly longer duration of the first reset signal can therefore be performed for the sake of safety. When this also fails, the microcontroller is switched to a currentless state by switching off the power supply voltage and is set in this way to a low-power error mode. This is sensible because it can be assumed in such a case that there is an error in the microcontroller. Unnecessary current consumption is avoided because the microcontroller is now currentless.

After a reset procedure, the microcontroller must normally release the reset lines after a predetermined period of time, i.e. the potential provided on the reset line for a reset must be replaced by the "free state" of the reset line again after this predetermined period of time. If this is not the case, either the microcontroller has not ended the reset procedure in accordance with the prescriptions or the reset line itself is clamped at a different potential. In both cases, there is an erroneous state which can be advantageously monitored by the reset arrangement as defined in claim 6 and which state is ended by the reset arrangement in that it switches the microcontroller to a currentless state and thus minimizes the current consumption.

In accordance with a further embodiment of the invention as defined in claim 7, the reset arrangement may be advantageously constituted in such a way that it is always capable of setting the microcontroller to a low-power mode, even without any errors in the operative state. This may be advantageous when the microcontroller can be put out of operation for a foreseeable period of time.

In accordance with a further embodiment of the invention as defined in claim 8, the microcontroller is triggered by the reset arrangement waking up the microcontroller from its low-power mode after the occurrence of an internal or external wake-up event. Such a wake-up may take place in this manner both when switching to the low-power mode as defined in claim 7 and in the states in which the microcontroller was set to a low-power error mode after the occurrence of an error.

These and other aspects of the invention are apparent from and will be elucidated with reference to the embodiments described hereinafter.

Figure 2:
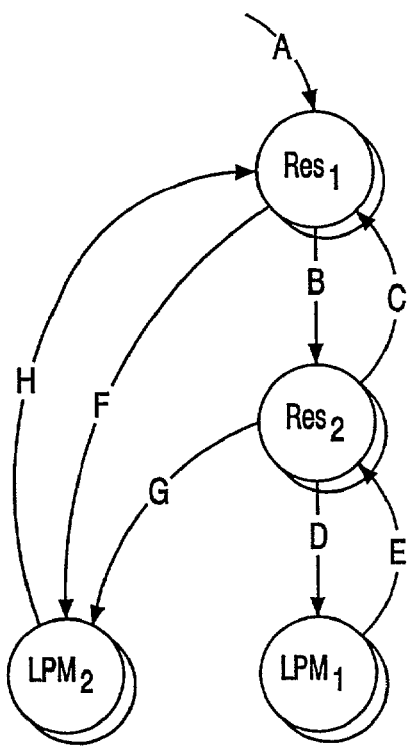

In the drawings:

FIG. 1 is a block diagram of a reset arrangement according to the invention in a system chip, and of a microcontroller to be reset, and FIG. 2 is a flow chart of the reset arrangement shown in FIG. 1.

FIG. 1 is a block diagram of a system chip 1 comprising a reset arrangement according to the invention (not shown in FIG. 1). A part of the system chip 1 is indicated within the broken-line square. This part comprises a power supply circuit 2 which supplies a power supply voltage VCC to a microcontroller 3, which is also shown diagrammatically in the Figure and is capable of switching this power supply voltage.

The part of the system chip 1 comprising the power supply circuit 2 is shown in broken lines because the power supply circuit 2 may also be arranged outside the system chip 1.

The power supply voltage of the overall system shown in FIG. 1 may be realized, for example, by means of a battery which supplies a power supply voltage BAT to the system chip 1 and the power supply circuit 2.

The power supply circuit 2 may, for example, control this voltage but particularly also switch it on and off. The power supply voltage VCC mentioned hereinbefore is applied, inter alia, to the microcontroller 3 but may also be applied to further hardware components which are not shown in FIG. 1.

The power supply circuit 2 is controlled by means of the system chip 1 and the reset arrangement according to the invention, provided in this chip.

There are essentially two connections between the reset arrangement according to the invention provided in the system chip 1 and the microcontroller 3. A reset line Res is provided by means of which the reset arrangement is capable of triggering the microcontroller 3. After a reset, the state of the reset line Res is monitored by the reset arrangement provided in the system chip 1.

Furthermore, a control connection of one or several bits wide is provided, which is denoted by Con in the Figure and allows a reciprocal control between the system chip 1 and the reset arrangement in this chip, on the one hand, and the microcontroller 3, on the other hand.

The reset arrangement in the system chip 1 has the object of resetting the microcontroller 3. Basically, this may be necessary under two circumstances. On the one hand, there may be a system cold start. In a system cold start, the microcontroller 3 initially does not receive any power supply voltage VCC, i.e. the microcontroller 3 is voltageless and inactive. After the power supply voltage VCC is supplied for the first time by means of the power supply circuit 2, the microcontroller 3 may be in an undefined state. Therefore, a reset procedure is required after supply of the power supply voltage. According to the invention, the reset arrangement in the system chip 1 supplies a reset signal on the reset line Res in this case, which reset signal has a first length which is dimensioned in such a way that, independent of the type of the microcontroller 3, a safe reset procedure takes place in any case, because, at this instant, it is not yet known to the system chip 1 which type of microcontroller 3 or other hardware is connected. The duration of this first reset signal is thus dimensioned to be relatively long so as to guarantee a safe reset of the microcontroller 3 under all circumstances.

After such a system cold start, cold starts may take place in which the power supply VCC is switched on again after it was previously switched off, for example, for the purpose of saving current. Furthermore, however, reset procedures may be required or desirable also in the operating phase in which the microcontroller 3 already receives the power supply voltage VCC. This situation relates to hot starts.

For such cold or hot starts, the reset arrangement uses a second, programmed reset signal of a shorter duration which is also supplied to the microcontroller 3 via the reset line Res and whose length is individually adapted to the requirements of the microcontroller 3 and possibly further circuit elements, which are not shown in FIG. 1 but are also to be reset.

To realize this second reset signal in an optimal way, the microcontroller 3 supplies a signal via the control lines CON after a successful system cold start, which signal is received by the reset arrangement in the system chip 1 and indicates the duration of a second, programmed reset signal. After this programming procedure, each cold or hot start is performed—as elucidated above—with this optimized length of the second, programmed reset signal.

After possible failures of reset procedures, which will be further described with reference to FIG. 2, the microcontroller 3 can be set to a low-power mode by switching off the power supply voltage VCC. This saves energy. If the microcontroller 3 is to be reactivated from this state, the reset arrangement according to the invention in the system chip 1 receives an external wake-up signal via a line WU. When this signal appears, the reset arrangement supplies a corresponding signal to the power supply circuit 2 which thereupon switches on the power supply voltage VCC again. Furthermore, the reset arrangement performs a system cold start reset, i.e. a reset by means of the first reset signal, because there were apparently previous reset failures.

It will be elucidated with reference to the flow chart in FIG. 2 under which circumstances which reset procedures are performed. Furthermore, it is elucidated with reference to this Figure under which circumstances and how the microcontroller 3 is set to a low-power mode.

The arrow A in FIG. 2 indicates the system state in which the overall system or at least the microcontroller 3 was initially in a powerless state but in which now the power supply voltages BAT and VCC are switched on. As is indicated by the state $Res_1$ in FIG. 2, the microcontroller is then reset by means of the first reset signal.

When this reset procedure is successful, the length of the second reset signal is supplied to the reset arrangement, as is indicated by arrow B. Subsequent reset procedures in which cold or hot starts are concerned are then performed by means of the second reset. This is indicated by the second state $Res_2$ in FIG. 2. Already after performing the system cold start reset procedure in accordance with the block $Res_1$ in FIG. 2, it is monitored whether the microcontroller 3 of FIG. 1 releases the reset line after a predetermined period of time. If, for example, a high potential is provided for a reset signal on the reset line, the reset line must change to the low potential again after this predetermined period of time. If this is not the case, there is either an error on the part of the microcontroller 3, or the reset lines Res is clamped at a high potential. In both cases, the reset arrangement in the chip 1 of FIG. 1 sets the microcontroller 3 to a low-power error mode with VCC switched off, which is denoted by the block $LPM_2$ in the Figure. The monitoring of these two states and the transition to this mode is indicated by means of the arrow F in FIG. 2.

As already explained above, further cold or hot starts are performed with a reset signal of the second, programmed length after a system cold start, which is denoted by the block $Res_2$ in FIG. 2. After such a cold or hot start, it may be monitored whether the microcontroller responds. This may be done, for example, by what is called a watchdog which is a type of timer circuit regularly monitoring given states of the microcontroller. When the microcontroller does not respond after a predetermined period of time after a cold or a hot start, it can be assumed that the hot start was not successful. In this case, a renewed start having the duration of the first reset signal is performed, as indicated by arrow C in FIG. 2. If this start is successful, the further procedure takes place as indicated by arrow B, or else there is an erroneous state and one of the error conditions as indicated by arrow F prevails so that the system is set to the low-power mode $LPM_2$ with VCC switched off.

The system can be woken up from the low-power error mode $LPM_2$ by means of the reset arrangement according to the invention. In this case, a wake-up signal is supplied to the reset arrangement via the wake-up line WU of the circuit of FIG. 1, which reset arrangement triggers a switch-on of the power supply voltage by means of the power supply circuit 2 and triggers a system cold start reset with the duration of the first reset signal. It may also be desirable to set the microcontroller 3 to a low-power mode also when the microcontroller 3 of FIG. 1 operates faultlessly, thus without any error condition. This may be advantageous for reasons of energy saving. The reset arrangement according to the invention is also used for this purpose; as required, for example, by means of control software, the microcontroller 3 may supply a corresponding signal via the control connection CON to the reset arrangement in the system chip 1, whereupon this arrangement switches the power supply circuit 2 in such a way that the power supply voltage VCC of the microcontroller 3 is switched off. This is indicated in FIG. 2 by the arrow D and the block $LPM_1$ which is the low-power mode. This low-power mode is also triggered by a signal on the line WU of the circuit of FIG. 1 so that the power supply voltage VCC is switched on again and connected to a reset signal having the duration of the second programmed reset signal. This is indicated by arrow E in FIG. 2.

The arrangement according to the invention may also be adapted individually to the actual conditions by the variable length of the second programmed reset signal. Moreover, it is possible to monitor the reset procedure and, dependent on the error condition, it can reset the microcontroller either with the programmed reset signal of the second duration or reset it again but this time with a reset signal of the first duration. Moreover, it is possible to set the microcontroller to the low-power mode even when the error condition is not eliminated after a further reset procedure with the first length of the reset signal.

In addition to the individual adaptation to the microcontroller 3, the reset arrangement according to the invention also provides an optimum monitoring of this microcontroller and a saving of energy in the case of an error that cannot be eliminated, which saving of energy is obtained by setting the microcontroller 3 to a low-power mode $LPM_2$.

What is claimed is:

1. A reset arrangement for a microcontroller (3), wherein the reset arrangement
   is capable of applying a reset signal to the microcontroller (3) via a reset line (Res),
   supplies a first reset signal ($Res_1$) upon a system cold start of the reset arrangement and the microcontroller (3), the duration of this first reset signal being chosen to be such that any provided type of microcontroller (3) starts reliably,
   is programmed with a second reset signal ($Res_2$) after a system cold start of the microcontroller (3), the duration of this second reset signal being adapted to the requirements of the microcontroller (3), and
   supplies the second, programmed reset signal ($Res_2$) as a reset signal at subsequent cold or hot starts.

2. A reset arrangement as claimed in claim 1, characterized in that the reset arrangement is arranged on a system chip (1) which also comprises analog components (2) and components for power supply.

3. A reset arrangement as claimed in claim 1, characterized in that, the second programmed reset signal ($Res_2$) has a shorter duration than the first reset signal ($Res_1$).

4. A reset arrangement as claimed in claim 1, characterized in that in the case where a reset of the microcontroller (3) by means of the second reset signal ($Res_2$) fails upon a cold or a hot start, the reset arrangement subsequently supplies a reset signal corresponding to the first reset signal ($Res_1$).

5. A reset arrangement as claimed in claim 4, characterized in that, in the case where a reset of the microcontroller by means of the first reset signal ($Res_1$) also fails, the reset arrangement sets the microcontroller to a low-power error mode ($LPM_2$).

6. A reset arrangement as claimed in claim 1, characterized in that the reset arrangement monitors the reset line after supply of a reset signal and sets the microcontroller (3) to a low-power error mode ($LPM_2$) in the case where, after the reset, the microcontroller does not release the reset line (Res) after a predetermined period of time, or in the case where the reset line (Res) is clamped at an external potential.

7. A reset arrangement as claimed in claim 1, characterized in that the reset arrangement is capable of waking up the microcontroller (3) from a low-power mode ($LPM_1$).

8. A reset arrangement as claimed in claim 5, characterized in that the reset arrangement wakes up the microcontroller (3) from a low-power mode ($LPM_1$, $LPM_2$) after the occurrence of an internal or external wake-up event.

* * * * *